May 11, 1937. H. C. PIERLE 2,080,228
WORK ROTATING STRUCTURE FOR MACHINE TOOLS
Filed Feb. 18, 1936
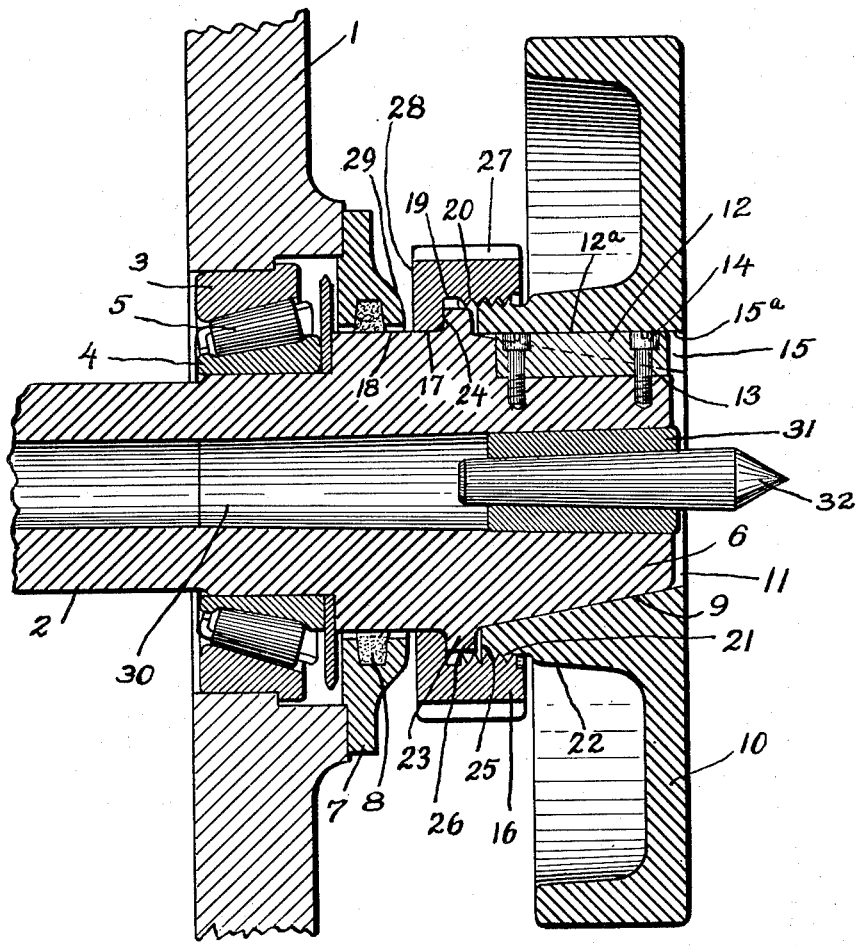
Inventor
Henry C. Pierle
By Allen & Allen
Attorneys Patented May 11, 1937

2,080,228

UNITED STATES PATENT OFFICE 2,080,228

WORK ROTATING STRUCTURE FOR MACHINE TOOLS

Henry C. Pierle, Cincinnati, Ohio, assignor to The R. K. Le Blond Machine Tool Company, Cincinnati, Ohio, a corporation of Delaware Application February 18, 1936, Serial No. 64,524

10 Claims. (Cl. 82—30)

This invention relates to mountings for faceplates, chucks, fixtures and similar parts, on the spindles of lathes and other machine tools.

The conventional mounting comprises a screwthread on the spindle and a mating thread on the part to be mounted. That type of mounting is objectionable in that it lacks rigidity when subjected to heavy strains. It also lacks accuracy because it is well known that it is impossible to put on and take off a threaded face plate or other similar part repeatedly without the threads becoming worn and inaccurate.

The threaded mounting is also undesirable especially in the present day high speed lathes, because, should the rapidly revolving spindle of such lathes be stopped suddenly, the momentum of the part screwed to the spindle may be sufficient to cause such part to unscrew from the spindle, with the possibility of causing damage to the work and to the machine, and injury to the workman.

The conventional mounting further, is inconvenient in that it is necessary for the workman to exercise great care to see that the screw threads are free from foreign matter, and properly lubricated before being screwed together. When neglect of this sort occurs, the parts become jammed, or "frozen" together, with the result that the screw threads are damaged or injured beyond repair.

An object of my invention is to provide a spindle nose mounting which is effective in overcoming the difficulties aforementioned, and which is of a simple construction, economical to manufacture.

Another object is to provide a spindle mounting wherein the face plate, chuck, fixture or similar part, can be placed on the spindle nose and remain automatically supported thereon without being held by the operator, so that the operator is permitted to have both hands free for tightening the face plate on the spindle, or for other operations.

Another object is to provide a spindle mounting wherein the face plate or other work driving member is properly located and supported in proper alignment solely by means of the engagement of a tapered conical portion of the spindle nose with a mating tapered hole in the work driver.

Another object is to provide a means on the spindle nose which will automatically line up the work driver for proper engagement with the means for locking the work driver to the spindle.

Another object is to provide a simple yet effective means for driving the work driver in either direction and regardless of the rapidity of acceleration or deceleration of the spindle.

It is also a purpose to arrange a construction which can be easily maintained free of foreign matter and damage resulting from such matter.

By this arrangement I prevent excessive overhang of the work driver relative to the spindle bearing and also permit driving a work piece while held on centers by the engagement of the jaws of a chuck mounted on the spindle with the work piece.

My arrangement does not require a large flange formed integral with the spindle which is difficult to fabricate and machine accurately.

My arrangement also makes it practical to harden and grind the spindle which, of course, preserves accuracy and prevents damage to the spindle.

Other features of my invention will appear in the description of the drawing which is a diametral section through a typical lathe spindle nose embodying my invention.

The headstock housing 1 carries the spindle 2 in the usual anti-friction bearing comprising the outer race 3, the inner race 4, and the rollers 5. The nose portion 6 of the spindle 2 projects outwardly from the headstock housing 1 through a suitable oil seal ring 7 having the packing member 8 contacting the spindle so as to prevent lubricant from escaping from the anti-friction bearing and headstock interior.

The spindle nose portion 6 is provided with an accurately machined tapered cylindrical portion 9 concentric with the axis of spindle rotation. A work driving member, as for example the face plate 10, has an accurately machined tapered hole 11 which engages accurately the tapered portion 9 of the spindle, the engagement of the hole 11 with the tapered portion 9 serving as the sole means for locating and supporting the work driving means on the spindle.

Means for positively driving the work driver in either direction comprises a key 12 snugly fitted in a recess 13 in the tapered portion 9 of the spindle and secured therein by suitable screws 14. The work driver 10 is provided with a suitable keyway 15, the sides of which slidingly engage the sides of the key 12. When the work driver 10 is fully engaged on the tapered portion 9 the key 12 will be so arranged that a very small clearance will exist between the top 12a of the key 12 and the bottom 15a of the keyway 15. This clearance is of such a small amount as to be properly shown in the figure only by the single line representing the surfaces 12a and 15a. When not fully engaged by the tapered portion 9, the work driver 10 will be supported substantially in proper alignment on the spindle by contact of the top 12a of the key 12 with the bottom 15a of the keyway 15. By this arrangement the work driver 10 may be placed on the spindle, when the spindle is positioned so the key 10 will be located substantially vertically above the axis of the spindle, and moved axially of the spindle substantially in proper alignment therewith and without the danger of its falling from the spindle nose.

A locking collar 16, for securing the work driver 10 to the spindle 2, has a bore 17 loosely fitting around the cylindrical portion 18 of the spindle and a somewhat larger bore 19 which is provided with threads 20 adapted to engage mating threads 21 on the hub 22 of the work driver 10. A relatively small flange 23 formed integral with the spindle 2 provides an abutment for the inner surface 24 of the larger bore 19 of the locking collar 16 when the collar is advanced on the threads 21 of the work driver 10, whereby to draw the work driver axially in secure engagement with the tapered portion 9 of the spindle. It is to be clearly noted that the rear face 25 of the hub 22 of the work driver 10 does not contact the face 26 of the flange 23 when the work driver is securely locked on the spindle. Such construction completely eliminates the difficult and costly machining operations required properly to finish tapered cylindrical and radially extended surfaces of the spindle and work drivers to proper dimensions, such as were necessary in the flanged spindle mountings used prior to the construction of this invention.

Suitable means, as for example the slots 27 for a spanner wrench, are provided on the locking collar 16 for easy rotation of the locking collar in either direction.

It is to be noted that as the locking collar 16 is unscrewed from the hub 22 of the work driver, the rear face 26 of the locking collar 16 will abut against the face 29 of the oil seal ring 7 and thus provide the necessary wedging action to remove the work driver easily from the tapered portion 9 of the spindle 2.

Because the work driver 10 can be moved axially to or from engagement with the tapered portion 9 while substantially axially aligned with the spindle axis by contact of the face 12a of the key 12 with face 15a of the keyway 15, the threads 20 of the locking collar 16 are automatically aligned with threads 21 of the work driver 10 for easy engagement. A minimum of skill and time on the part of the operator are thus required.

This invention also permits of the full use of the conventional tapered spindle bore 30 in which may be inserted the usual spindle sleeve 31 and center 32.

Having fully set forth my invention, what I claim as new and desire to secure by Letters Patent, is:—

1. In a work-rotating structure for machine tools, the combination of a headstock, a spindle supported by said headstock and having a tapered nose portion concentric with its axis of rotation, a work driving member having a tapered bore mating the tapered nose portion of said spindle, said work driving member being located and supported in proper alignment solely by engagement of said tapered bore with said tapered nose portion when in operative engagement, and means for maintaining said bore and nose in substantial alignment when not in operative engagement.

2. In a work-rotating structure for machine tools, the combination of a headstock, a spindle supported by said headstock and having a tapered nose portion concentric with its axis of rotation, a work driving member having a tapered bore mating the tapered nose portion of said spindle, said work driving member being located and supported in proper alignment solely by engagement of said tapered bore with said tapered nose portion when in operative engagement, means for maintaining said bore and nose in substantial alignment when not in operative engagement, and means providing a positive driving connection between said spindle and said work driving member.

3. In a work-rotating structure for machine tools, the combination of a headstock, a spindle supported by said headstock, a work driving member supported by said spindle, means to secure said member to said spindle, and means on said spindle to automatically align said work driving member with said securing means when said member is partially engaged on said spindle.

4. In a work-rotating structure for machine tools, the combination of a headstock, a spindle supported by said headstock, a work driving member supported by said spindle, means to secure said member to said spindle, and means providing a positive driving connection between said spindle and said work driving member, said last mentioned means being secured to said spindle and serving to substantially align said work driving member with said securing means.

5. In a work-rotating structure for machine tools, the combination of a headstock, a spindle supported by said headstock and having a tapered nose portion, a work driving member supported by said spindle on said tapered portion, means to secure said member to said tapered portion, and means provided on said tapered portion for forming a positive driving connection between said spindle and said work driver, said last mentioned means also serving to substantially align said work driving member with said securing means when said tapered portions are not in contact.

6. A spindle nose construction for machine tools comprising, a tapered cylindrical portion concentric with the axis of spindle rotation, a relatively long key mounted longitudinally of the spindle and having its longitudinal faces parallel with the axis of spindle rotation, said tapered portion being the sole means for locating and supporting a work driver on said spindle, said key providing a positive driving connection between said spindle and said work driver.

7. A spindle nose construction for machine tools comprising, a tapered cylindrical portion concentric with the axis of spindle rotation, a relatively long key mounted on said tapered portion longitudinally of the spindle and having its longitudinal faces parallel with the axis of spindle rotation, and means on said spindle for holding a work driver in proper engagement with said tapered portion, engagement of said tapered portion of said spindle by a work driver providing the sole means for locating and supporting said work driver on said spindle, said key providing a positive driving connection between said spindle and a work driver mounted thereon.

8. A spindle nose construction for machine tools comprising, a tapered cylindrical portion concentric with the axis of spindle rotation, a relatively long key mounted on said tapered portion longitudinally of the spindle and having its longitudinal faces parallel with the axis of spindle rotation, and means on said spindle for holding a work driver in proper engagement with said tapered portion, engagement of said tapered portion of said spindle by a work driver providing the sole means for locating and supporting said work driver on said spindle, said key providing a positive driving connection between said spindle and a work driver mounted thereon, said key also providing the means for initially aligning a work driver on said spindle for proper engagement of said holding means with the work driver.

9. A work rotating structure for machine tools, comprising the combination of a headstock, a spindle mounted in said headstock and having a tapered cylindrical nose portion and a relatively small annular flange adjacent said nose portion, a relatively long key mounted on said tapered portion longitudinally of the spindle and having its longitudinal faces parallel with the axis of spindle rotation, a work driver having a tapered bore fitting precisely the tapered portion of said spindle and providing the sole means to definitely locate and support the work driver on the spindle, said work driver also having a keyway admitting said key to provide a positive driving connection between said work driver and spindle, and a clamping collar, journaled on a straight cylindrical portion of said spindle between said flange and said headstock, having threads engaging threads on a portion of said work driver for clamping said driver to said spindle.

10. A work rotating structure for machine tools, comprising the combination of a headstock, a spindle mounted in said headstock and having a tapered cylindrical nose portion and a relatively small annular flange adjacent said nose portion, a relatively long key mounted on said tapered portion longitudinally of the spindle and having its longitudinal faces parallel with the axis of spindle rotation, a work driver having a tapered bore fitting precisely the tapered portion of said spindle and providing the sole means to definitely locate and support the work driver on the spindle, said work driver also having a keyway admitting said key to provide a positive driving connection between said work driver and spindle, and a clamping collar, journaled on a straight cylindrical portion of said spindle between said flange and said headstock, having threads engaging threads on a portion of said work driver for clamping said driver to said spindle, a boss on said headstock said clamping collar being adapted to engage said boss when unscrewed, thereby assisting in removing said work driver from said spindle.

HENRY C. PIERLE.